United States Patent Office 2,967,427
Patented Jan. 10, 1961

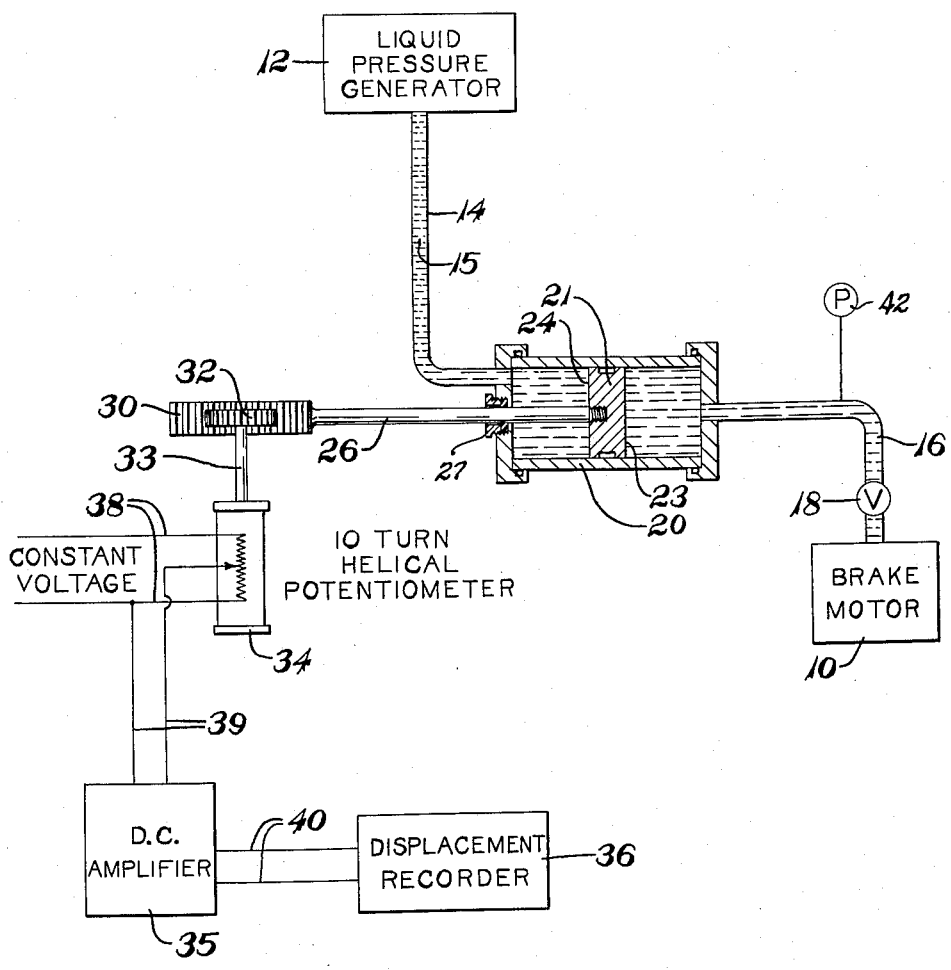

2,967,427

MEASURING BRAKE MOTOR DISPLACEMENT

Walter J. Le Blanc, Troy, Ohio, assignor to The B. F. Goodrich Company, New York, N.Y., a corporation of New York Filed Mar. 8, 1957, Ser. No. 644,792

5 Claims. (Cl. 73—149)

This invention relates to the manufacture of brakes, and more particularly it relates to the accurate measurement of the liquid capacity and the displacement volume of liquid-actuated motors for brakes. The invention has special utility in determining these relationships in brake motors having distensible walls such as rubber expander tubes, flexible metal diaphragms, and the like. As used herein "displacement volume" of a brake motor means the change in volume of the motor between its static condition when the brakes are released, and its actuated condition when the brakes are applied.

The invention provides a positive or direct mode of accurately measuring the volume of fluid displaced into a brake motor. One of the particular features of this equipment is that changes in the volume of actuating fluid in a brake motor may be accurately measured while the brake is in operation. Accordingly the equipment provides a means for measuring the rate of lining wear, brake drum thermal expansion, etc. In general, this is accomplished by incorporating into a liquid supply system for the brake motor to be measured a piston free for axial translational movement in response to pressure changes in the liquid of the system. The piston is in series with the liquid pressure generator of the system and with the particular brake motor associated with the system, and cooperates with the brake motor to define a closed liquid circuit for the liquid of the system between the piston and the motor. An accurate measure of the volume of fluid displaced into the motor when the system is pressurized is obtained by sensing and visually indicating the distance the free piston is advanced translationally as the liquid is displaced into the brake motor. The distance moved by the piston is sensed by generating with the movement of the piston an electrical signal which is proportional in magnitude to the distance moved by the piston. This signal is in turn suitably amplified and visually indicated on recording equipment.

In accordance with this invention liquid displacement can be measured to within an average error of less than 3%. Moreover, the measurement can be made simply without skilled operators and a convenient record of the measurements is made automatically. The procedure provided by this invention is far superior both in accuracy and in convenience to the procedures used heretofore for this purpose which have involved bleeding trapped liquid from the brake motor into a graduate to measure the liquid displaced to the motor.

The invention will be further described with reference to the accompanying drawing in which is schematically illustrated one particular apparatus embodying this invention and useful in practicing the method of measuring liquid displacement provided by invention.

In the drawing, a brake motor 10 is associated with a liquid-supply system including a liquid pressure-generator 12 and pipes 14 and 16. The brake motor 10, the displacement characteristics of which it is desired to measure, may be a rubber liquid-distensible expander tube used for actuating the expander tube brakes, or it may be a flexible walled metal diaphragm type motor or the like in which it is normally difficult to calculate the precise displacement characteristics. The generator 12 may be a conventional pump, master cylinder or other means of providing pressure on the liquid 15 which normally fills both pipes 14 and 16 and other portions of the system subsequently described. Preferably the brake motor 10 is connected to pipe 16 through a suitable valve 18 which is opened at the start of a test so that the fluid in pipe 16 communicates with the interior of the brake motor 10.

Pipes 14 and 16 are connected to the opposite ends of a high pressure cylinder 20 containing a free piston 22 movable axially through the cylinder in response to pressure changes in the liquid system. The piston 22 is in slidable sealing engagement with the cylinder wall so that between the forward face 23 of the piston and the brake motor there is trapped a determinate volume of liquid in pipe 16. The piston maintains this volume of liquid isolated from the liquid in pipe 14 which communicates with the rearward face 24 of the piston.

The piston 22 includes a rod 26 which is integrally fastened to the piston and which projects slidably through the end wall of the cylinder for reciprocating movement with the axial translational movement of piston 22. The end wall of the cylinder is provided with a suitable packing gland 27 to permit reciprocation of the rod 26 without substantial leakage.

At the outer end of rod 26 there is attached a rack 30 which is meshed with a pinion 32. The pinion in turn is mounted on a shaft 33 of a helical potentiometer 34 so that the rotation of the pinion resulting from reciprocation of the rack advances the slidable member (not shown) of the potentiometer. The apparatus additionally includes an amplifier 35 to magnify the output voltage of the potentiometer, and a recording mechanism 36 operated by the output of the amplifier. Inasmuch as the potentiometer 34, the amplifier 35 and recorder 36 are conventional commercial units, no detailed explanation of their construction is necessary. The helical potentiometer 34 is preferably an instrument known in the trade as a "Helipot" and a 2,000 ohm, 10 turn instrument is suitable for this equipment. The amplifier is any conventional D.C. amplifier, for example a BL320 Brush Universal Amplifier. A suitable recorder for this purpose is a BL202 Brush Oscillograph.

In the use of this equipment, a brake motor 10 for which the displacement characteristics are to be measured is connected to valve 18 and the valve is then opened so that the liquid in pipe 16 is in communication with the expansion chamber of the particular motor. The brake motor is bled to remove air from it and the brake system and the motor and system are entirely filled with hydraulic liquid.

With the brake motor properly positioned, a constant reference voltage is supplied to the potentiometer 34 through the leads 38 and the instruments adjusted so that there is zero voltage across its output leads 39. Then pressure is applied to the liquid 15 throughout the system by the generator 12. Accordingly, the free piston 21 is urged axially forward (to the right in the drawing) displacing the liquid ahead of the piston through pipe 16 into the brake motor until the liquid of the system is raised to the desired operating pressure. A pressure gauge 42 connected with pipe 16 is preferably provided to indicate the pressure of the liquid in the motor.

The rod 26 is moved rightward with the movement of the piston 21 to rotate the pinion and drive the slidable member (not shown) along the reference resistance of the potentiometer. The distance traveled by the piston and therefore the volume of fluid displaced into the brake motor is directly proportional to the change in voltage appearing across the output leads 39 of the potentiometer as a result of the movement of the slidable member of the potentiometer. This voltage is amplified by the amplifier 35 and the output of the amplifier is delivered to the recorder 36 through the leads 40. Preferably the recorder is of the type which traces a curve of fluid displacement versus time.

Variations in the apparatus and in the procedure disclosed may be made within the scope of the appended claims.

I claim:

1. The method of determining the volume of liquid displaced to a brake motor, which method comprises interposing an axially movable free piston in a liquid supply system in series between the brake motor and a liquid pressure generator so that the free piston and the fluid motor define a closed liquid circuit for the intervening liquid, pressurizing said system with said generator to displace said piston translationally and thereby displace liquid from said closed circuit into the brake motor, and measuring the resulting axial translational movement of said piston to determine the volume of liquid displaced into the motor.

2. The method of determining the volume of liquid displaced into a liquid-distensible hollow rubber article such as an expander tube brake motor, which method comprises interposing an axially movable free piston in a liquid supply system in series between the article and a liquid pressure generator whereby the piston defines with said article a closed liquid circuit for the intervening liquid, pressurizing said system with said generator to displace said piston axially against said closed liquid circuit to thereby displace liquid in said closed circuit into said article, sensing the axial translational movement of said piston by generating with the movement of said piston an electrical signal proportional to the displacement of the piston, and indicating the magnitude of said signal as a measure of the liquid displaced into said article.

3. The method of determining the volume of liquid displaced into a liquid-distensible brake motor, which method comprises interposing an axially movable free piston in a liquid supply system in series between the brake motor and a liquid pressure generator whereby the piston defines with said fluid motor a closed liquid circuit for the intervening liquid, pressurizing said system with said generator to displace said piston axially against said closed liquid circuit to thereby displace liquid in said closed circuit into said motor, generating an electrical signal proportional to the axial translational movement of said piston, and indicating the magnitude of said signal as a measure of the volume of liquid displaced into said brake motor.

4. Apparatus for measuring the volume of liquid displaced into a brake motor, which apparatus comprises a liquid supply system for a brake motor including a liquid pressure generator, an axially movable free piston interposed in said system in series with said generator and a brake motor to be actuated by the system, said piston and the associated brake motor cooperating to define a closed liquid circuit for the intervening liquid and said piston being movable translationally when the system is pressurized by said generator to displace liquid in said closed liquid circuit to said brake motor, a rod rigidly connected to said piston and projecting therefrom to a region outside the liquid system, an electrical signal generator engaged with said rod outside the liquid system and adapted to generate an electrical signal proportional to the slidable movement of said rod resulting from said displacement of the piston, and means to record the magnitude of said signal as a measure of the volume of liquid displaced into the brake motor.

5. Apparatus for measuring the volume of liquid displaced into a liquid-distensible article such as a brake expander tube, the apparatus comprising a liquid supply system including a liquid pressure generator and liquid pipes and means for attaching an expander tube to said pipes, a cylinder mounted in said supply system in series with said generator and with an expander tube associated with said system, a free piston in said cylinder, said piston and the associated expander tube cooperating to define a closed liquid circuit for the intervening liquid and said piston being movable translationally when the system is pressurized by said generator to displace liquid in said closed liquid circuit to said brake motor, a rod rigidly connected to said piston and projecting therefrom slidably through said cylinder and movable reciprocably with the translational displacement of said piston, a potentiometer having its adjustable member engaged with said rod and adapted to generate an electrical signal proportional to the axial movement of said rod resulting from said displacement of the piston, means for amplifying said signal, and means for visually recording the magnitude of said signal as a measure of the volume of liquid displaced into the expander tube.

References Cited in the file of this patent

UNITED STATES PATENTS

| | | |
|---|---|---|
| 1,076,664 | Cloud | Oct. 28, 1913 |
| 2,314,540 | Huntington | Mar. 23, 1943 |
| 2,327,642 | Horner | Aug. 24, 1943 |
| 2,737,804 | Herzog et al. | Mar. 13, 1956 |
| 2,745,087 | Dickinson | May 8, 1956 |

FOREIGN PATENTS

| | | |
|---|---|---|
| 897,331 | Germany | Nov. 19, 1953 |

OTHER REFERENCES

Publication "A Piston Type Volume Recorder," by C. P. Luck, Journal Scientific Instruments, vol. 29, October 1952, pages 333–334.